US006886065B2

(12) United States Patent
Sides et al.

(10) Patent No.: US 6,886,065 B2
(45) Date of Patent: Apr. 26, 2005

(54) IMPROVING SIGNAL INTEGRITY IN DIFFERENTIAL SIGNAL SYSTEMS

(75) Inventors: Chi Kim Sides, Spring, TX (US); Sompong Paul Olarig, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 551 days.

(21) Appl. No.: 09/967,613

(22) Filed: Sep. 29, 2001

(65) Prior Publication Data

US 2003/0070026 A1 Apr. 10, 2003

(51) Int. Cl.[7] .......................... G06F 13/38; H03K 17/16

(52) U.S. Cl. ............................ 710/305; 326/21; 714/47

(58) Field of Search ................................ 710/305, 106, 710/100, 62; 326/14, 21, 30; 709/250; 702/69; 327/89; 370/284; 714/47

(56) References Cited

U.S. PATENT DOCUMENTS 5,138,284 A * 8/1992 Yabuki et al. ................ 331/56
5,374,861 A * 12/1994 Kubista ....................... 326/30
5,430,396 A * 7/1995 Morano ....................... 326/90
5,570,037 A * 10/1996 Llorens ....................... 326/30
5,864,715 A * 1/1999 Zani et al. .................... 710/63
6,275,864 B1 * 8/2001 Mancusi et al. ............ 709/250

OTHER PUBLICATIONS

"Effects of termination networks on signal–induced EMI from the shields of Fibre Channel cables operating in the Gb/s regime" by Knighten, J.L.; Smith, N.W.; DiBene, J.T., II; Hoeft, L.O. (abstract only).*

Hall, Stephen H., et al., *High–Speed Digital System Design A Handbook Of Interconnect Theory And Design Practices*, 2 cover pgs., pp. 65–67 2000.

Kaufer, Steve, et al., *Terminating Differential Signals On PCBs, Printed Circuit Design*, at pp. 25–28 (Mar., 1999).

* cited by examiner

*Primary Examiner*—Gopal C. Ray

(57) ABSTRACT

Over-terminating the differential mode impedance of a differential transmission line, such as an INFINIBAND™ cable, at the receiving end, improves the differential signal integrity for typical variations in termination network impedance component (e.g., resistor) and transmission line characteristics. Eye opening of the differential signal can be made larger with reduced attenuation but increased jitter compared to under-terminating the differential mode impedance. Because the differential signal quality (larger eye opening) is improved, data can be transmitted over a longer transmission line with the same transmitter and receiver.

29 Claims, 4 Drawing Sheets

IMPROVING SIGNAL INTEGRITY IN DIFFERENTIAL SIGNAL SYSTEMS

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention is related to high-speed signaling, and in particular, improved signal integrity and impedance termination in high-speed (e.g., gigahertz) differential signaling systems.

2. Description of the Related Art

As processors and memory technologies have become more powerful, demand for higher input/output (I/O) bandwidth has also increased for achieving optimal system performance. Various high-speed I/O technologies are being employed, for example, low voltage differential signaling, small computer system interface ("LVDS SCSI") and the recent INFINIBAND™ ("IB") architectural specification. The IB architecture addresses industry trends toward more modular and distributed architectures. IB encompasses I/O, such as server-to-storage communication and interprocessor communication between servers, and it uses high-speed, bi-directional serial links between each host channel adapter (HCA) and target channel adapter (TCA).

High speed signaling, however, tends to generate noise. For example, cables used in high-speed signaling systems, typically, the longest parts of the system, can act as efficient antennas that pick up and/or radiate noise. This may cause certain products to fail radiofrequency emission control specifications established by the Federal Communications Commission (FCC) or other regulating agencies in various countries. These specifications address electromagnetic compatibility (EMC) and/or electromagnetic interference (EMI). EMC is the ability of an electronic system, such as a computer, to function properly in its intended electromagnetic environment, without being a source of pollution. Designing computer equipment to exhibit effective EMC and minimize EMI is therefore important.

There are several known ways to minimize cable noise. Shielded differential cables, for example, can be used to improve EMC. Also, as is well known to those skilled in the art, perfect impedance matching of cables and system printed circuit boards (PCBs) is desirable to minimize signal reflection, potentially improving signal integrity and reducing the propensity for noise generation. But, perfect impedance matching can be difficult to achieve in practice, and may be cost prohibitive for most products. Also, as the speed of the transmission increases, any imbalance in the same differential signal pair caused by imperfect driver or cable skew can degrade signal quality and increase radiation. To maintain signal integrity and meet EMI requirements, this skew within differential signals driven by the same driver must be tightly controlled. The present invention addresses these and other problems associated with high-speed signaling systems.

BRIEF SUMMARY OF THE INVENTION

Over-terminating the differential mode impedance of a differential transmission line, such as an INFINIBAND™ cable, at the receiving end, improves the differential signal integrity of the transmission line when variations can occur in impedance component (e.g., resistor) and transmission line characteristics. Over-terminating demonstrates eye-opening characteristics of the differential signal that are improved compared to under-terminating the differential mode impedance. Differential signal quality is improved, as demonstrated by larger eye opening. Thus, data can be transmitted over a longer transmission line with the same transmitter and receiver.

Embodiments of the present invention provide a method for improving differential signal integrity in a transmission line system. The method includes propagating a differential signal on a transmission line, and over-terminating the differential signal at the receiver.

Other embodiments of the present invention provide an apparatus for improving high-speed differential signal integrity in a transmission line system. The apparatus includes a transmission line and a termination network coupled to the transmission line adapted to over-terminate a differential mode of the transmission line.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
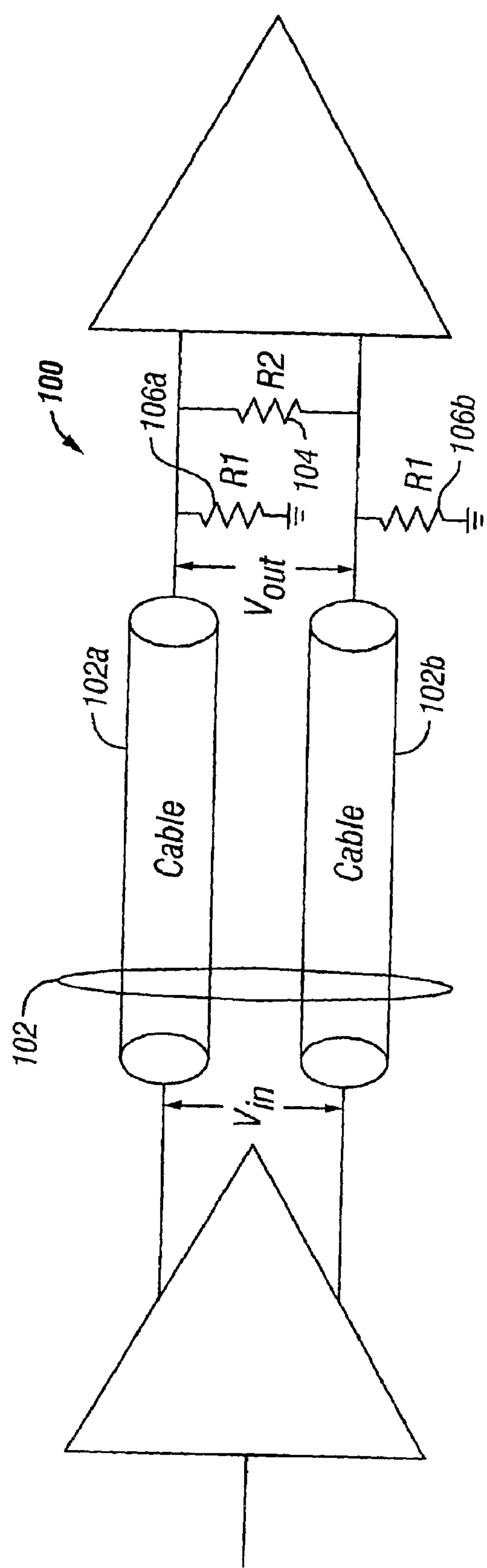
FIG. 1 is a schematic diagram of a termination network in accordance with an embodiment of the invention.

Embodiments of the present invention improve signal integrity and eye opening of high-speed transmission signals, which potentially lowers system cost and shortens the time-to-market of products.

Although the INFINIBAND™ ("IB") architecture is referred to herein, it should be understood that this is merely exemplary of a wide variety of high-speed system architectures in which the present invention can be employed. In the IB Architecture, the differential output impedance, $Z_d$, is specified at 125 ohms maximum and 75 ohms minimum for differential mode (at the IB connector pins from 100 MHz to 1,875 GHz). See, e.g., the INFINIBAND™ Architecture Release 1.0a (the IB specification), which is incorporated by reference herein in its entirety. The characteristic impedance of the cables and printed wiring is nominally 100 ohms differential. The single ended output impedance is specified at 75 ohms maximum and 30 ohms minimum. The single ended output impedance matching is specified at 10%, which means that the output impedance of the plus and minus outputs of the differential driver shall match within 10%. The single ended impedance can be more variable than the differential impedance, depending on the amount of coupling to the transmission line. In the IB architecture, connections are specified to support the isolation of the high-speed differential inputs and outputs. The shield returns are connected to logic ground on the module. The primary purpose of these connections is to provide for isolation of the differential signals from each other. The shields also help to insure that the desired impedance of the link is maintained.

Measuring the "eye-opening" of a high-speed signal system is a well-known qualitative and quantitative technique for evaluating such systems. The technique typically is used to evaluate signal attenuation and jitter. Too much attenuation and/or jitter can degrade high-speed signals. By over-terminating (i.e., over-impedance matching) the differential mode impedance of a differential cable, such as an IB cable, using a termination network at the receiving end (i.e., after the termination network), the eye opening of the differential signal can be made larger in accordance with embodiments of the invention. Such embodiments should be cost effective.

Differential driver characteristics can be specified to guarantee the specified eye opening at the receiver (i.e., after the termination network) within defined topologies. See, e.g., the IB specification, p. 134 and FIG. 20 therein. The driver amplitude is specified at a sufficiently high value to allow for interconnect path attenuation.

As will be appreciated by those skilled in the art, real world differential signals contain both differential mode and common mode. The undesirable common mode signal comes from imbalances in the system, such as from driver or transmission line skew. If the common mode signals are left unterminated, EMI radiation will increase. Therefore, it is important to terminate both differential and common modes appropriately, as will be described below.

Two different exemplary termination network embodiments are described herein that will provide termination for both differential and common mode signals. Effects of termination impedance components' (e.g., resistors') tolerances on the signal quality are also analyzed. Signal quality is improved (i.e., larger eye opening) thus allowing the signal to be transmitted over a longer transmission line. The present invention conforms with or exceeds the requirements of the IB and LVDS SCSI specifications.

Pi-Termination Network

A "pi"-termination network 100 is shown in FIG. 1, in accordance with an embodiment of the invention. As will be appreciated by those skilled in the art, a pair of coupled signals can be considered as a composite of common (even) mode signals and differential (odd) mode signals. These coupled signals can propagate in transmission line 102, which is composed of cables 102*a* and 102*b* in FIG. 1. Considering just the common mode component alone, there is zero net current flow in R2 resistor 104. That is, for a pair of pure common mode signals, the termination impedance component (e.g., resistor) network (i.e., resistors 104, 106*a* and 106*b*) appears as the parallel combination of the two R1 resistors 106*a* and 106*b*. These signals should be terminated with the common mode impedance of the transmission line 102. Therefore, the value of R1 typically should be chosen so that the resistor value equivalent to the parallel combination of the R1 resistors 106*a* and 106*b* (i.e., R1||R1 or R1/2) equals the common mode impedance of the transmission line 102. This results in impedance matching of the common mode impedance.

Now, considering just the differential mode component alone in FIG. 1, there is no current flow to ground. Thus, the two R1 resistors 106*a* and 106*b* appear in series with each other across the R2 resistor 104. These differential signals typically should be terminated with the differential mode impedance of the transmission line 102. Therefore, the value of the R2 resistor 104 should be chosen so that the resistor value equivalent to the parallel combination of R2 with the series combination of the two R1 resistors (i.e., R2||(R1+R1) or R1R2/(R1+R2/2)) equals the differential impedance of the transmission line 102. This results in impedance matching of the differential mode impedance.

Given the characteristic impedance matrix of the transmission line 102, the values of the R1 resistors 106*a* and 106*b* and the R2 resistor 104 can be calculated. Let the characteristic impedance matrix of the transmission line 102 be $$Z_0 = \begin{bmatrix} Z_{11} & Z_{12} \\ Z_{21} & Z_{22} \end{bmatrix},$$

where $Z_{11}=Z_{22}$ and $Z_{12}=Z_{21}$ if the differential pair is symmetric, as will be appreciated by those skilled in the art. By definition, $Z_{odd}=Z_{11}-Z_{12}$, $Z_{even}=Z_{11}+Z_{12}$, $Z_{diff}=2Z_{common}=Z_{even}/2$. Therefore, for impedance matching, the resistor values of the pi-termination network 100 are given by $$R1=Z_{11}+Z_{12}=Z_{even} \text{ and}$$

$$R2=[(Z_{11})^2-(Z_{12})^2]/Z_{12}$$

T-Termination Network

Figure 2:
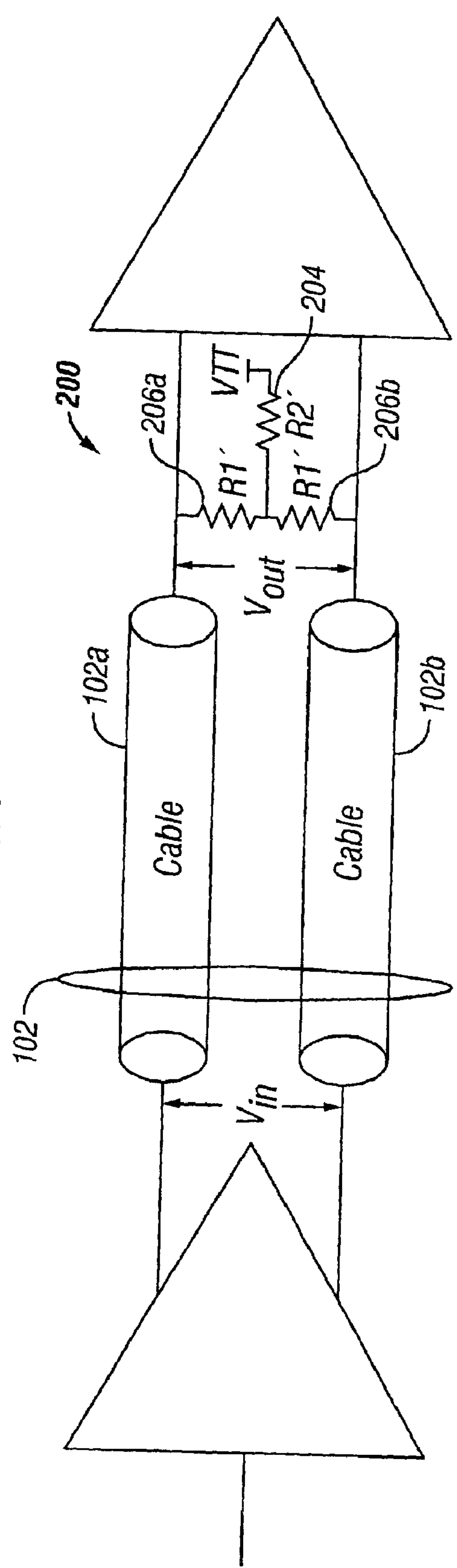
FIG. 2 is a schematic diagram of a termination network in accordance with another embodiment of the invention.

A "T"-termination network 200 is shown in FIG. 2, in accordance with another embodiment of the invention. The network 200 also can provide appropriate termination for both differential and common modes of the transmission line 102. In FIG. 2, $V_{TT}$ is a reference voltage level, for example, ground potential, although it could be any reference potential. The formula for the values of impedance components (e.g., resistors) R1' and R2' can be derived in analogy to FIG. 1 as follows. To a set of differential signals propagating in the transmission line 102, there is no current flow through R2' resistor 204 to $V_{TT}$, so the T-termination network 200 appears as a series combination of two R1' resistors 206*a* and 206*b*. The differential signals therefore typically should be terminated with the differential mode impedance of the transmission line 102 composed of the cables 102*a* and 102*b*. Thus, the value of the resistors R1' of the T-termination network 200 should be $$R1'=\tfrac{1}{2}Z_{diff}=Z_{11}-Z_{12}=Z_{odd}.$$

To a set of common mode signals, the common mode current will flow through the two R1' resistors 206*a* and 206*b* and the R2' resistor 204 to $V_{TT}$. The T-termination network 200 thus appears as the R2' resistor 204 in series with the parallel combination of the two R1 resistors 206*a* and 206*b*. For common mode impedance matching, these signals typically should be terminated with the common mode impedance of the transmission line 102, i.e., $$R2' + (R1' \| R1') = Zcommon = \frac{Z11 + Z12}{2} = \frac{Zeven}{2}, \text{ so}$$

$$R2' = Z_{common} - \tfrac{1}{2}R1'.$$

Note that the transmission line 102 and cables 102*a* and 102*b* of FIGS. 1 and 2 are merely exemplary of embodiments of the present invention. In fact, the present invention can be employed in other transmission line systems, including, but not limited to, any differential PCB traces, such as strip lines, dual strip lines, microstrips, and the like, and in other transmission line systems. The improvements provided by the embodiments of the present invention are described below in more detail in relation to the values of the termination resistors of the termination networks.

Termination Analysis

For the above embodiments, the acceptable tolerance of the termination resistors 104, 106*a* and 106*b* (FIG. 1) and 204, 206*a* and 206*b* (FIG. 2) should be determined. The tighter the tolerance, the higher the cost. The optimum point between cost and performance is the desired operating implementation. The value of the termination resistors will affect the eye opening of the differential signal and the common mode current. The use of eye opening evaluation is well known in the art, as discussed above. In determining the acceptable tolerance and optimum point, the objective is to keep the eye opening as large as possible. SPICE or other computer program simulations, for example, can be used to study the sensitivity of the signal quality with respect to the tolerance of these termination resistors. For instance, features of the present invention can be tested by simulation of differential cables, as follows. It is to be understood that actual results based on real hardware implementations may vary, as will be appreciated by those skilled in the art. But, the variations due to actual results based on real hardware implementations will not detract or change the concepts, spirit or scope of the present invention.

Simulation-Eye Opening Versus Termination

This analysis assumes the use of a 2-meter 24 AWG TwinAx cable, having differential impedance of 100 ohms and common mode impedance of 35 Ohms in the T-termination network 200 of FIG. 2. Note that a similar analysis could be performed with respect to the termination network of FIG. 1. Using the formulas provided in the previous section, the values of R1' and R2' that will provide perfect impedance matching for both differential and common mode are R1'=50 Ohm, and R2'=10 Ohm (See FIG. 2). Assuming an input differential signal (Vin) of 1.6V peak-to-peak with a rise and a fall time of 100 ps, and a within-pair skew of 100 ps each, the input signal pattern is a $2^7-1$ pseudo random bit sequence (PRBS) with the unit interval (bit time) equal to 400 ps or 2.5 Gbit/s. The output signal (Vout) is an eye pattern diagram observed at the end of cables 102*a* and 102*b*, as will be appreciated by those skilled in the art. The time domain attenuation in dB is 20 log (Vout/Vin) and the jitter is measured at 50% amplitude of the eye opening. For this simulation, the results are summarized in Table I below.

TABLE I

Eye Opening of Differential Signal versus Termination

| Differential Mode Term | Common Mode Term | Attenuation (dB) | Jitter (ps) | Reference FIG. |
|---|---|---|---|---|
| Perfect match (100 Ω) | Perfect match (35 Ω) | 2 | 13 | 3 |
| Perfect match | 28 Ω or −20% | 2 | 13 | |
| Perfect match | 42 Ω or +20% | 2 | 13 | |
| 110 Ω or +10% | Perfect match (35 Ω) | 1.9 | 20 | |
| 110 Ω or +10% | 44.5 Ω or +27% | 1.9 | 20 | |
| 110 Ω or +10% | 54.5 Ω or +56% | 1.9 | 20 | |
| 120 Ω or +20% | Perfect match (35 Ω) | 1.9 | 29 | 5 |
| 120 Ω or +20% | 47 Ω or +34% | 1.9 | 29 | |
| 90 Ω or −10% | Perfect match (35 Ω) | 2.9 | 23 | |
| 90 Ω or −10% | 28 Ω or −20% | 2.9 | 23 | |
| 90 Ω or −10% | 44.5 Ω or +27% | 2.9 | 23 | |
| 80 Ω or −20% | 37 Ω +5% | 4.1 | 36 | |
| 80 Ω or −20% | 47 Ω or +34% | 4.1 | 36 | |
| 80 Ω or −20% | Perfect match (35 Ω) | 4.1 | 36 | 4 |

The simulation results shown in Table I indicate that the common mode termination (column 2) does not affect the eye opening of the differential signal because the attenuation (column 3) and jitter (column 4) appear independent of the common mode termination variation for the values shown. But, over-terminating the differential signal (shown as an increased or percent increased resistance in column 1) will reduce time domain attenuation (column 3) and increase jitter (column 4). On the other hand, under-terminating the differential signal (shown as a decreased or percent decreased resistance in column 1) will increase both time domain attenuation (column 3) and jitter (column 4). Now, because typically the impedance of the transmission line or medium and the value of the termination resistors are specified with some percentage of uncertainty, one cannot be certain that the differential mode impedance can be terminated at its exact value (i.e., exactly impedance matched). Therefore, in accordance with embodiments of the invention, to achieve the optimal signal quality, over-termination of the differential signals or differential mode should be employed and under-termination should be avoided. Choosing resistor values that will terminate the differential mode for the high limit of the differential impedance of the transmission line or medium (for example, in FIGS. 1 and 2), and assuming the low limit value of the resistors R1 and R2 or R1 'and R2' can do this. Note that the values given in Table I are exemplary and may also be considered approximate values. Also, note that there is some jitter even for perfect impedance matching because of the lossy effects of the cables. A similar analysis to that above can be shown for the pi-termination network 100 of FIG. 1, which will lead to the same general conclusion.

Figure 3:
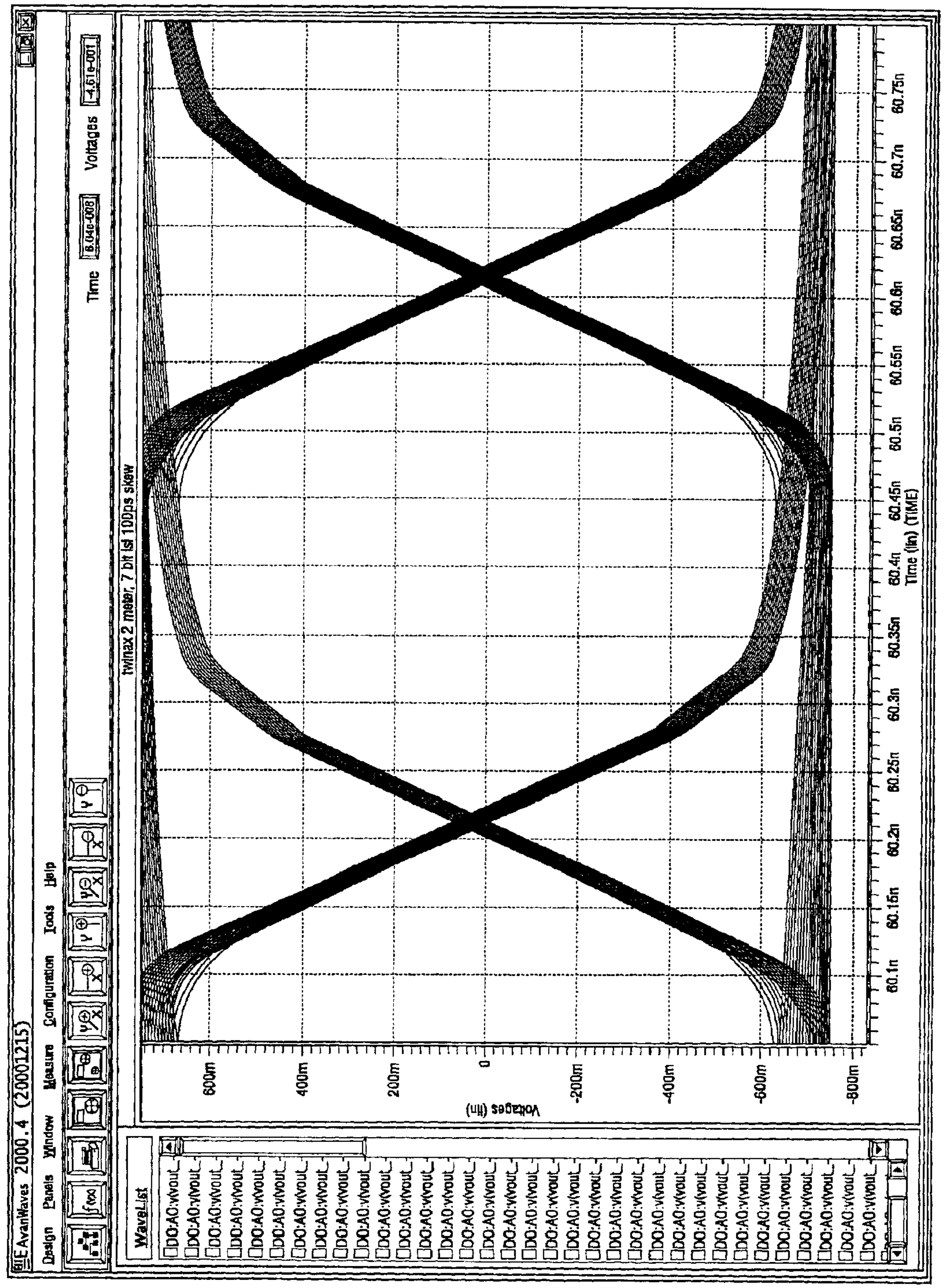
FIG. 3 is a simulated eye opening diagram at the end of a transmission line using the termination network of FIG. 2 for perfect impedance matching of a differential mode.
Figure 4:
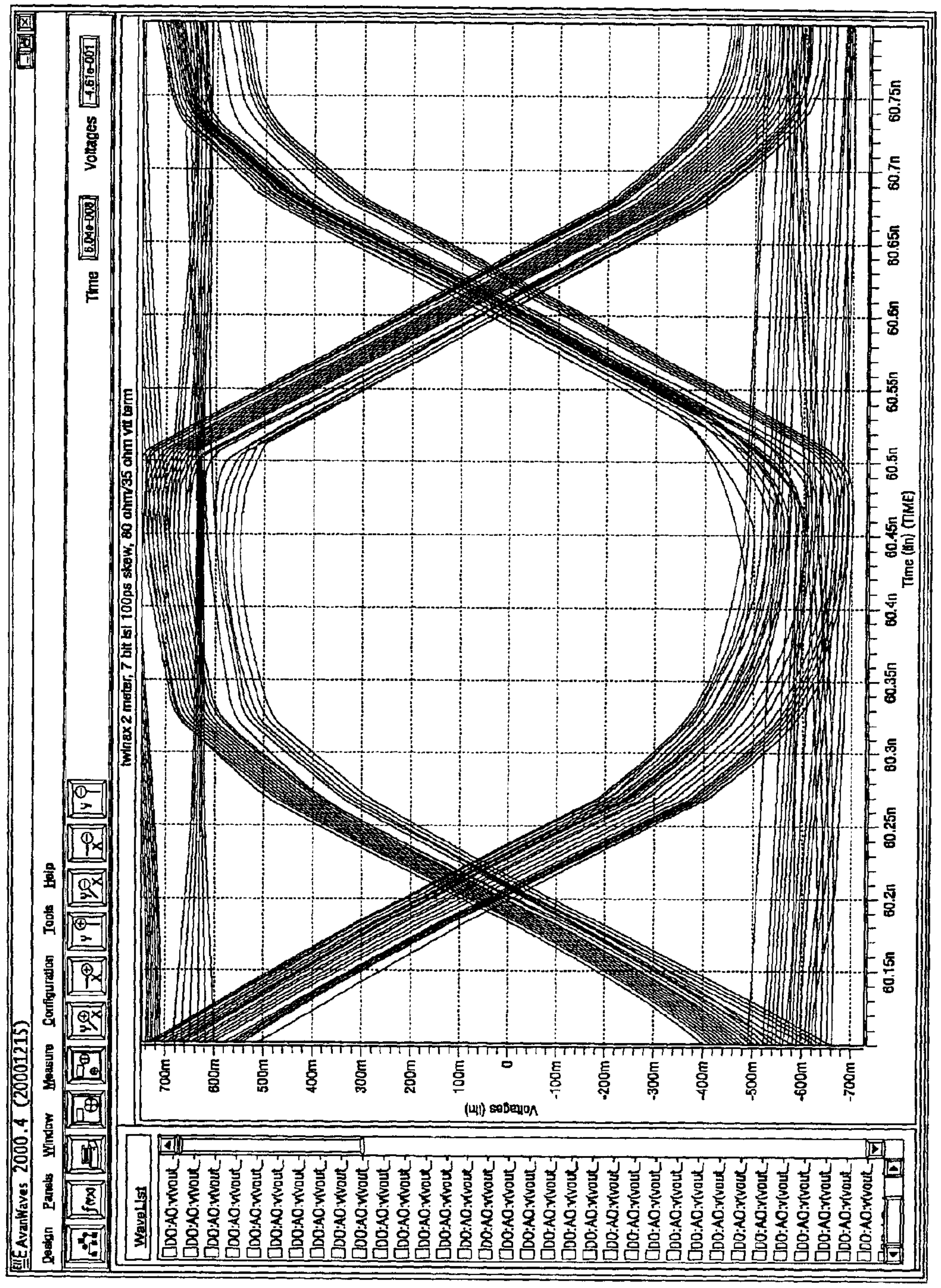
FIG. 4 is a simulated eye opening diagram at the end of a transmission line using the termination network of FIG. 2 for under-terminating (under-matching) an impedance of a differential mode.
Figure 5:
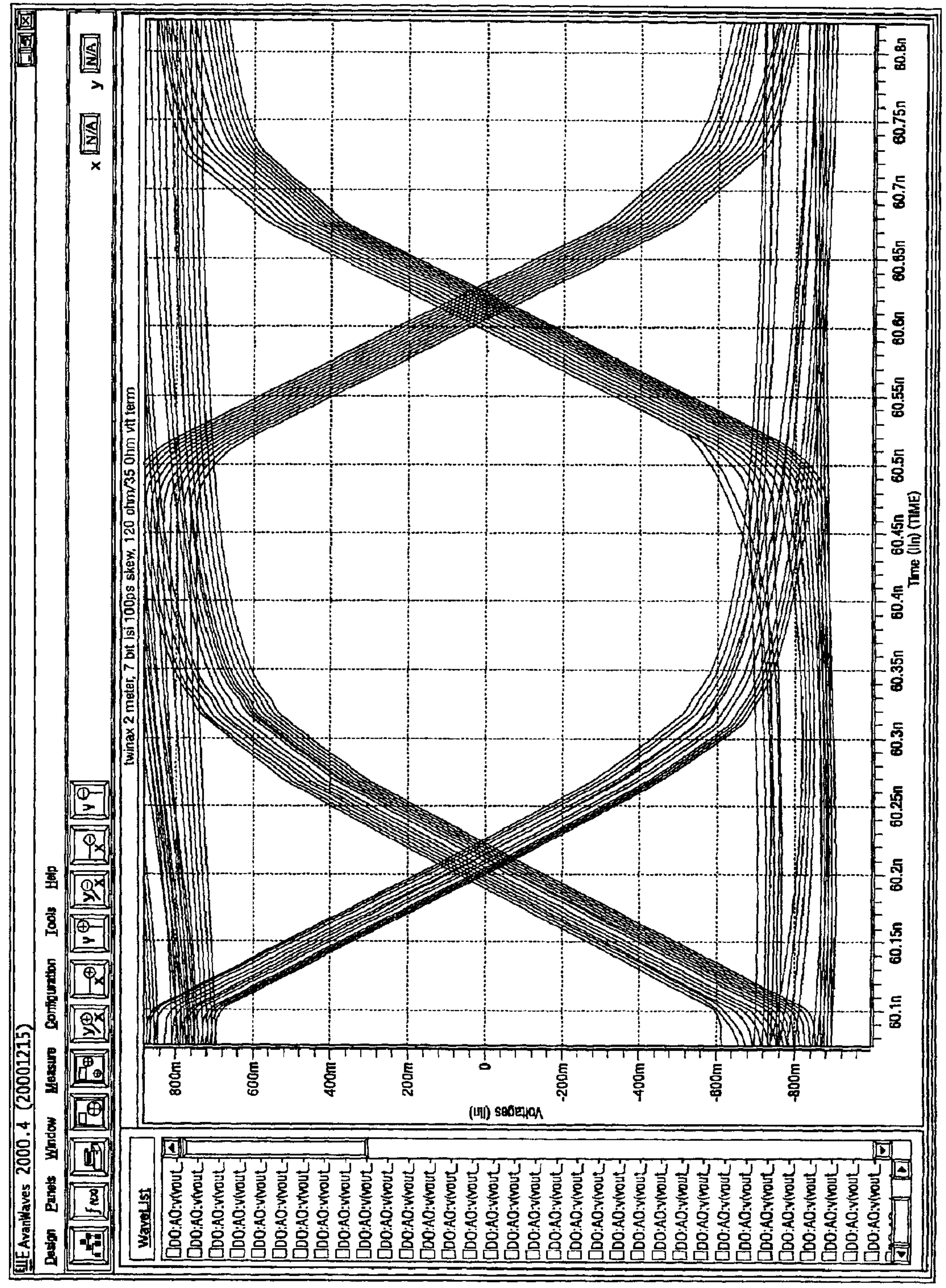
FIG. 5 is a simulated eye opening diagram at the end of a transmission line using the termination network of FIG. 2 for over-terminating (over-matching) an impedance of a differential mode in accordance with another embodiment of the invention.

FIGS. 3–5, which are referenced in Table I, demonstrate the effects of impedance matching and over- and under-terminating on attenuation and jitter, as summarized for particular exemplary cases in Table I. FIG. 3 shows the eye opening at the receiving end of a transmission line, such as that shown in FIG. 2 for perfect impedance matching (row 2 of Table I). On the other hand, FIG. 4 shows the eye opening at the end of the transmission line for −20% under-terminating the differential mode signal (row 15 of Table I). FIG. 5 shows the eye opening at the end of the transmission line for +20% over-terminating the differential mode signal (row 8 of Table I). It should be apparent from Table I that the above analysis shows that the eye opening is in general better for over-terminating than under-terminating, according to the present invention.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A method for improving differential signal integrity in a transmission line system, the method comprising:

propagating a differential signal on a transmission line; and over-terminating the differential signal at a termination network, wherein the over-terminating comprises terminating the differential signal such that less attenuation but more jitter results compared to perfect impedance matching of the differential signal when performing eye opening tests on the transmission line.

2. The method of claim 1, wherein the over-terminating comprises over-terminating the differential signal at a pi-termination network.

3. The method of claim 1, wherein the over-terminating comprises over-terminating the differential signal at a T-termination network.

4. The method of claim 1, wherein the over-terminating comprises over-terminating the differential signal at a termination resistor network.

5. The method of claim 1, wherein the propagating comprises propagating a high-speed differential signal on the transmission line.

6. The method of claim 1, wherein the over-terminating comprises over-terminating the differential signal at impedance components.

7. The method of claim 6, wherein the transmission line has a differential impedance, further comprising choosing the impedance component values at a high limit of the differential impedance of the transmission line.

8. An apparatus for improving high-speed differential signal integrity in a transmission line system, comprising:

a transmission line; and a termination network coupled to the transmission line and adapted to over-terminate a differential mode of the transmission line, wherein the termination network is adapted to terminate the differential signal such that less attenuation but more jitter results compared to perfect impedance matching of the differential signal when an eye opening test is performed on the transmission line.

9. The apparatus of claim 8, wherein the termination network comprises a pi-termination network.

10. The apparatus of claim 8, wherein the termination network comprises a T-termination network.

11. The apparatus of claim 8, wherein the termination network comprises a termination resistor network.

12. The apparatus of claim 8, wherein the termination network comprises impedance components.

13. The apparatus of claim 12, wherein the transmission line has differential impedance, and wherein the impedance component values are chosen at a high limit of the differential impedance of the transmission line.

14. The apparatus of claim 8, wherein the transmission line is adapted to propagate a high-speed differential signal.

15. The apparatus of claim 8, wherein the transmission line comprises differential printed circuit board traces.

16. The apparatus of claim 8, wherein the transmission line comprises strip lines.

17. The apparatus of claim 8, wherein the transmission line comprises dual strip.

18. The apparatus of claim 8, wherein the transmission line comprises microstrips.

19. An apparatus for improving high-speed differential signal integrity in a transmission line system, comprising:

a transmission line; and a termination network coupled to the transmission line and adapted to over-terminate a differential mode of the transmission line, wherein the over-termination is less than or equal to approximately 20% over perfect impedance matching of the differential mode of the transmission line.

20. The apparatus of claim 19, wherein the termination network comprises a pi-termination network.

21. The apparatus of claim 19, wherein the termination network comprises a T-termination network.

22. The apparatus of claim 19, wherein the termination network comprises a termination resistor network.

23. The apparatus of claim 19, wherein the termination network comprises impedance components.

24. The apparatus of claim 23, wherein the transmission line has differential impedance, and wherein the impedance component values are chosen at a high limit of the differential impedance of the transmission line.

25. The apparatus of claim 19, wherein the transmission line is adapted to propagate a high-speed differential signal.

26. The apparatus of claim 19, wherein the transmission line comprises differential printed circuit board traces.

27. The apparatus of claim 19, wherein the transmission line comprises strip lines.

28. The apparatus of claim 19, wherein the transmission line comprises dual strip.

29. The apparatus of claim 19, wherein the transmission line comprises microstrips.

* * * * *